US008528328B2

(12) United States Patent
Stroph et al.

(10) Patent No.: US 8,528,328 B2
(45) Date of Patent: Sep. 10, 2013

(54) EXPLOSION PROTECTION FOR A TURBINE AND COMBUSTION ENGINE

(75) Inventors: Peter Stroph, Friedrichshafen (DE); Ronald Hegner, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 413 days.

(21) Appl. No.: 12/925,094

(22) Filed: Oct. 13, 2010

(65) Prior Publication Data

US 2011/0083433 A1 Apr. 14, 2011

(30) Foreign Application Priority Data

Oct. 14, 2009 (DE) .......................... 10 2009 049 841

(51) Int. Cl.
*F02B 33/44* (2006.01)
(52) U.S. Cl.
USPC ........................................................ 60/605.1
(58) Field of Classification Search
USPC ................ 60/602, 605.1; 415/9, 177, 196, 415/197, 200, 203, 204, 205, 206, 214.1; 417/407
See application file for complete search history.

(56) References Cited

U.S. PATENT DOCUMENTS

| 1,698,514 | A | * | 1/1929 | Schmidt ........................... 74/609 |
| 3,602,602 | A | * | 8/1971 | Motta ................................ 415/9 |
| 3,652,176 | A | * | 3/1972 | Walsh ............................... 415/9 |
| 3,761,205 | A | * | 9/1973 | Cronstedt ..................... 417/407 |
| 3,928,963 | A | * | 12/1975 | Devers et al. .................. 60/806 |
| 4,057,359 | A | * | 11/1977 | Grooman ........................... 415/9 |
| 4,377,370 | A | * | 3/1983 | Porcelli ............................. 415/9 |
| 4,547,122 | A | * | 10/1985 | Leech ................................ 415/9 |
| 4,639,188 | A | * | 1/1987 | Swadley .......................... 415/9 |
| 4,705,454 | A | * | 11/1987 | Bouiller et al. ............... 415/197 |
| 4,818,176 | A | * | 4/1989 | Huether et al. .................... 415/9 |
| 4,875,837 | A | | 10/1989 | Usami et al. |
| 4,902,201 | A | * | 2/1990 | Neubert ........................ 415/197 |
| 4,934,899 | A | * | 6/1990 | Patacca ............................ 415/9 |
| 4,961,685 | A | * | 10/1990 | Neubert ........................ 415/197 |
| 5,328,324 | A | * | 7/1994 | Dodd ................................ 415/9 |
| 5,403,148 | A | * | 4/1995 | Forrester .......................... 415/9 |
| 5,431,532 | A | * | 7/1995 | Humke et al. .................... 415/9 |
| 5,447,411 | A | * | 9/1995 | Curley et al. ..................... 415/9 |
| 5,486,086 | A | * | 1/1996 | Bellia et al. ....................... 415/9 |
| 6,238,617 | B1 | * | 5/2001 | Strasser et al. ................ 264/624 |
| 6,575,694 | B1 | * | 6/2003 | Thompson et al. ............... 415/9 |
| 6,637,186 | B1 | * | 10/2003 | Van Duyn ....................... 60/223 |
| 6,837,674 | B2 | * | 1/2005 | Phillips, III ....................... 415/1 |
| 7,076,942 | B2 | * | 7/2006 | Schreiber ......................... 60/223 |
| 2004/0018102 | A1 | * | 1/2004 | Wand et al. .................... 417/407 |
| 2007/0101715 | A1 | * | 5/2007 | Martin et al. ................. 60/605.1 |
| 2010/0192570 | A1 | * | 8/2010 | Schlienger et al. .......... 60/605.1 |
| 2010/0316494 | A1 | * | 12/2010 | Gru mann et al. ............ 415/231 |
| 2012/0020771 | A1 | * | 1/2012 | Hollman et al. ........... 415/121.2 |

FOREIGN PATENT DOCUMENTS

DE 196 40 654 4/1998
DE 102 20 573 7/2003

(Continued)

*Primary Examiner* — Kenneth Bomberg
*Assistant Examiner* — Jason T Newton
(74) *Attorney, Agent, or Firm* — Klaus J. Bach

(57) ABSTRACT

In an explosion protection for gas a turbine which includes a turbine wheel and a turbine housing surrounding the turbine wheel, wherein the explosion protection comprises a multi-layer structure of material of a high rupture strength, the explosion protection is in the form of an essentially closed pot including a bottom section and a sash extending fully around the bottom section for accommodating the turbine housing.

8 Claims, 1 Drawing Sheet

(56) References Cited

FOREIGN PATENT DOCUMENTS

| DE | 10218436 C1 | * | 8/2003 |
| DE | 10 2004 018 987 | | 11/2005 |
| DE | 102008022390 A1 | * | 11/2009 |
| EP | 2180163 A2 | * | 4/2010 |

* cited by examiner

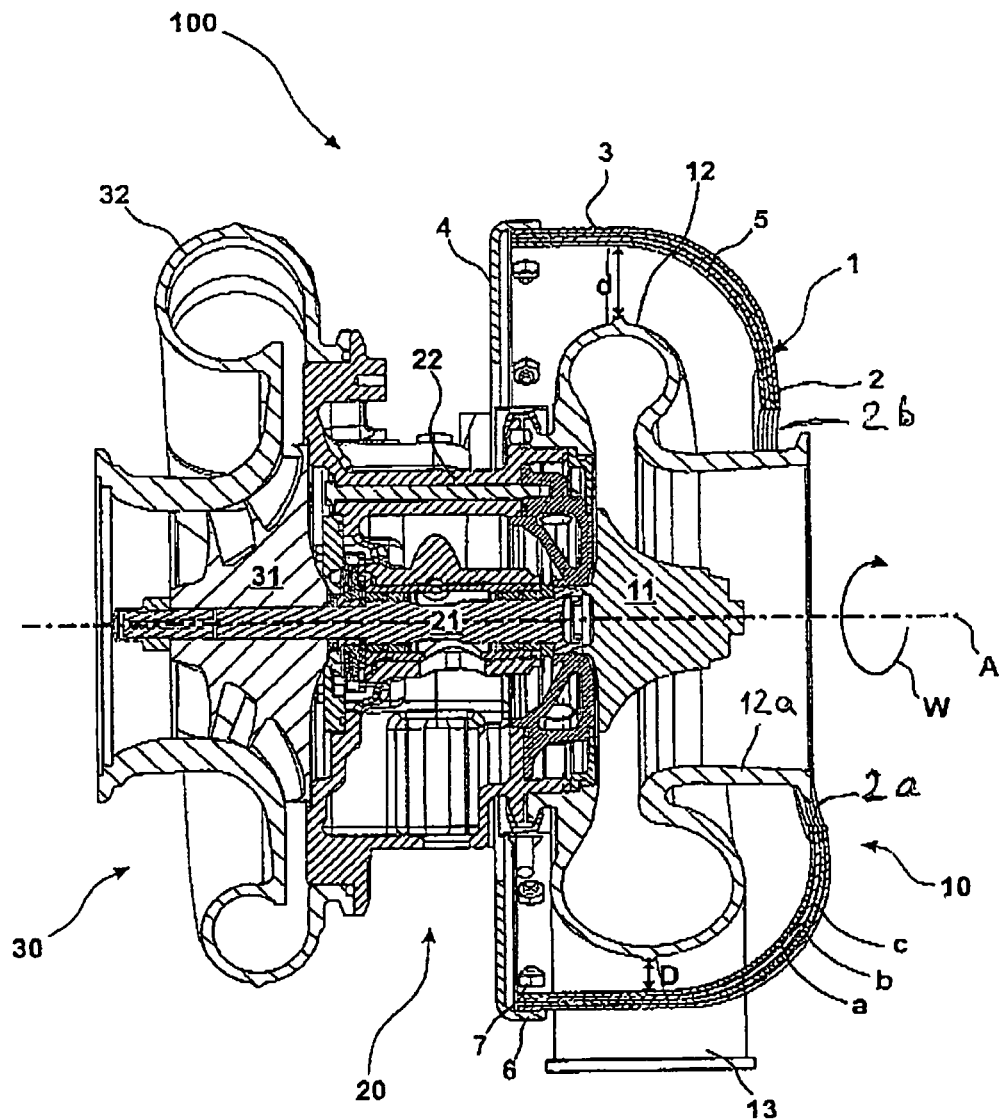

EXPLOSION PROTECTION FOR A TURBINE AND COMBUSTION ENGINE

BACKGROUND OF THE INVENTION

The invention resides in an explosion protection for a gas turbo machine which includes a turbine housing completely enclosing a turbine wheel, wherein the explosion protection comprises a structure of several layers of a material with high rupturing strength. The invention also resides in a gas turbo machine with a turbine housing which fully surrounds a turbine wheel rotatably supported in the housing and which is provided with explosion protection. The invention is also concerned with a combustion engine and a gas turbo machine.

Modern high-power gas turbo machines, for example exhaust gas turbochargers of internal combustion engines often present a risky to the ambient area in case of failure of their rotating parts. In particular, in uses where persons may be in close proximity of such machines, it must be ensured that, upon failure of such a machine, all fragments and, if applicable, secondary fragment parts are completely and safely captured.

For example, U.S. Pat. No. 4,875,837 discloses a multi-layer explosion protection structure wherein a steel plate with a heat insulating material disposed therein is mounted in spaced relationship around a turbine housing and mounted to a spiral part of the turbine housing. It is however a disadvantage of the explosion protection provided thereby that it surrounds only a 120° area of the spiral section of the housing.

DE 196 654 A1 disclose an explosion protection disposed on the outside of a gas inlet housing of a radial turbine for a turbocharger which is in the form of a spiral sheet metal housing and is removably connected to the gas inlet housing via several screws. Also such an explosion protection may, with a loss of the housing, be effective only in a very limited way since it is mounted to the housing.

DE 102 20 573 C1 discloses an explosion protection consisting of an insulation structure, including a first and a second metal sheet, which is glued onto the housing of a turbine. The metal sheet is herein limited to an angular area which corresponds to the main energy emission area of the exploding turbine.

An explosion protection is also known from DE 10 2004 018 987 A1 of the Assignee of the present application which consists of a textile material of high strength and which forms a closed ring surrounding the turbine housing. The side walls of the explosion protection may consist of metal sheets of high rupture strength. Such an explosion protection is quite suitable for providing all around protection from an exploding turbine but improvements in providing overall and lasting protection of an exploding turbine are still possible.

It is the object of the present invention to provide an explosion protection and a gas turbine as well as an internal combustion engine wherein, in case of an explosion of a turbine, an overall and lasting protection is ensured. In particular, the explosion protection structure should consist of a material of improved rupture strength or it should have a structure which is suitable to improve the rupture strength thereof.

SUMMARY OF THE INVENTION

In an explosion protection for gas turbine which includes a turbine wheel and a turbine housing surrounding the turbine wheel wherein the explosion protection comprises a multi-layer structure of material of a high rupture strength, the explosion protection is in the form of an essentially closed pot including a bottom section and a sash extending fully around the bottom section for accommodating the turbine housing.

In a gas turbine such an explosion protection structure is mounted onto the gas turbine such an explosion protection is mounted to the turbine so as to fully surround the turbine housing.

The invention is based on the consideration that, for increasing the rupture strength not only a suitable material is needed but that also the structure of the explosion protection should be suitably designed. The inventors have recognized that this can be achieved if a multi-layer structure for the explosion protection includes at least two layers of metal sheets of high rupture strength. In this way, the material benefits of a metal sheet material and structural design features can be combined to provide a compound arrangement which advantageously increases the rupture strength of the structure. Furthermore, the inventors determined that, for a protection from damages caused by an exploding turbine, a cover-up of only a limited angular area will be insufficient. It has been recognized that it is advantageous and possible to provide the multi-layer cover structure with a sash area which extends fully around the multi-layer explosion protection cover structures. It has further been found that with a closed pot structure including a bottom joined to the sash area an explosion protection for a turbine can be achieved not only for the circumferential area but also toward the side of a turbine using also a multi-layer sheet structure which is furthermore attached to the sash. Vice versa, the multi-layer sash attached to the bottom of the pot structure is stabilized because of its incorporation into an integral closed pot structure. The pot-like arrangement has substantial advantages over conventional solutions which provide exclusively a sash or a sash structure which is separate from the bottom. With the arrangement according to the invention in particular weak areas formed for example by insufficiently good connections between separate parts of an explosion protection structure are avoided. The arrangement according to the invention provides for a turbine explosion protection with a closed pot structure which overcomes the disadvantages encountered with conventional explosion protection arrangements.

With regard to gas turbo machines, the inventors have found that an arrangement where the explosion protection structure is not directly connected to the turbine housing but the connecting structure is arranged at a distance from the turbine housing is best suitable to ensure protection. Then the protection structure is held in place even if the turbine housing cannot withstand the explosion of the turbine rotor. It has been found, that the explosion protection structure does not need to be mounted to the turbine housing but can be supported by other support structures.

Concerning the explosion protection structure as such, it has been found to be particularly advantageous if the sash is integrally connected to the bottom. As integral connection basically a pot structure is to be understood wherein the sash and the bottom are joined in a material-locking relationship. Furthermore, particularly advantageous are pot structures wherein the sash and the bottom structure are manufactured as a single part. For example, the pot structure may advantageously be formed by deformation of a metallic base part. It has been found to be particularly advantageous in the development of the concept according to the invention if the bottom and the sash are formed as a multi-layer arrangement of single piece layers of the multi-layer structure. This embodiment ensures an increased rupture strength as it forms a multi-layer metal sheet arrangement for the bottom as well as for the sash of the pot structure.

In a preferred first embodiment of the invention, a layer of the multi-layer structure is formed into a pot like sheet metal part by deformation of a single one-piece metal sheet and the multi-layer structure is formed by joining a plurality of such pot-like sheet metal parts for forming the multi-layer pot structure. In other words, a single layer pot structure can be formed individually, one after another by a deformation process and the individual pot-like metal sheets can then be joined for forming the multi-layer pot structure. In an alternative, second, variant of the development, surprisingly it has been found that the multi-layer structure for forming the pot structure can also be formed by a direct deformation of a multi-layer metal sheet arrangement. That is, in a second embodiment, a multi-layer arrangement of single metal sheets can be deformed in a multisheet arrangement so that the individual sheet metal parts are deformed together and at the same time for forming the multi-layer pot structure. This provides for a manufacturing process which is comparatively simple. The first variant however facilitates the manufacture of comparatively thick-walled explosion protection structures.

In a particularly preferred development, the multi-layer structure includes a cover which is arranged opposite the bottom. The cover may for example comprise a single layer or several layers, for example, a single or several metal sheets. The cover does not need to be connected to the closed pot structure of the earlier described embodiment in a material locking manner or so as to form a single piece. Rather, the cover may be attached to the pot structure in another suitable manner for example by means of form-locking or frictional engagement or another mechanical connection such as a screw connection.

Particularly preferred is a cover in the form of a back plate in particular a single layer backplate of metal.

For the attachment of the cover to the pot structure, the cover is preferably provided with a circumferential rim to which the pot structure is mounted. It is particularly advantageous if the sash of the pot structure is attached to the rim, in particular the inside area of the rim, for example via a screw connection. This embodiment is particularly suitable for providing a variable angular position of the pot structure with respect to the cover. Particularly simple is an installation via a radial screw installation.

Concerning a gas turbine, it has been found to be particularly advantageous if the explosion protection structure including the cover—particularly a cover in the form of a comparably stable backplate—is attached to the gas turbine away from the turbine housing. It has been found to be particularly advantageous if the explosion protection structure is mounted to a bearing housing. In a gas turbine, the turbine wheel is mounted on a shaft which is supported by a bearing disposed in a bearing housing. The bearing housing forms a stable mounting location which is not affected by a turbine wheel explosion. In a preferred turbocharger, the turbine wheel and the compressor impeller are mounted on the same shaft and the compressor impeller is disposed in a compressor housing. The explosion protection structure may alternatively or also additionally mounted the compressor housing.

The explosion protection structure has also been found to be particularly suitable for mounting on a radial gas turbine which includes a spiral turbine housing.

The invention may also be used in connection with an internal combustion engine provided with a turbocharger according to the invention.

Exemplary embodiments of the invention will be described below in greater detail with reference to the accompanying drawings.

BRIEF DESCRIPTION OF THE DRAWINGS

The sole FIGURE (FIG. 1) is an axial sectional view of a turbocharger according to the invention including a preferred embodiment of an explosion protection structure.

DESCRIPTION OF PARTICULAR EMBODIMENTS

Below, identical or functionally identical parts are indicated by the same reference numerals.

The exhaust gas turbocharger 100 as shown in FIG. 1 includes a gas turbine 10 provided with an explosion protection structure 1, a bearing 20 and a compressor 30. The turbine 10 includes a turbine wheel 11 which is mounted on a shaft 21 supported in a bearing 20 together with a compressor wheel 31 of the compressor 30. The compressor wheel 31 is arranged in a compressor housing 32, which in accordance with the design of the compressor as radial compressor, is a radial compressor housing to which fresh air is admitted in an axial direction.

The turbine wheel 11 of the turbine 10 is arranged in a turbine housing 12 in the form of a radial turbine housing. Exhaust gas of an internal combustion engine which is not shown in the FIGURE enters the housing 12 radially and leaves the housing along the axis A of the turbine.

For the unlikely case that—for example by entry of a foreign material or another unpredictable event—the turbine wheel is destroyed and pieces thereof penetrate the turbine housing 12 or partially or completely destroy the turbine housing, the present embodiment of the gas turbine 100 includes the explosion protection structure 1 which is in the form of a pot structure which extends around the turbine housing 12 so as to essentially enclose it. The pot structure is formed by a bottom part 2 and a sash 3 of the explosion protection structure 1. In accordance with the concept according to the present invention, the sash 3 extends over a fully circumferential angular area W around the bottom structure 2. Accordingly, the pot structure, largely closed, surrounds the turbine housing 12 over its full circumference of an angular area W. The expression "largely closed" defines a pot structure which is closed except for passages for an operating fluid. The explosion protection structure 1 has for example a passage for an inlet duct 13 to the turbine housing 12. The passage is accordingly arranged at the sash 3 of the pot structure. The bottom 2 of the pot structure includes a passage for discharging the operating fluid along the axis A. These passages are necessary for accommodating the operating fluid flow but the closed state of the pot structure which retains parts of an exploding turbine over the whole circumference W is not violated thereby.

In a preferred embodiment of the gas turbine 100, the explosion protection structure 1 extends around the gas turbine housing 12 in spaced relationship at distances d, D. The distances d, D are shown only as examples and of course vary depending on the locations. In an embodiment not shown herein, the spacing may be provided to accommodate for example filler material such as insulation material or other sound, heat or impact reducing materials.

Preferably, according to the invention, the explosion protection structure 1 is not attached to the turbine housing but remote from the turbine housing. In the embodiment shown herein, the explosion protection structure includes a cover 4 in the form of a backplate which is mounted on a bearing housing 22 of the bearing 20. In this way, the explosion protection structure 1 is supported independently of the turbine housing 12 so that, even with a destruction of the complete turbine housing 12, the explosion protection structure remains safely in place connected to the turbine 10.

The explosion protection structure itself consists in accordance with the invention of three layers a, b, c of metal sheets of high rupture strength. The multi-layer structure formed in this way represents a circumferentially closed pot structure as each of the layers a, b, c is a single-piece pot-like metal sheet part with a bottom-like section for forming the bottom wall 2 and a sash-like section, the sash 3. The bottom wall 2 includes an axial opening 2a with a rim 2b through which a turbine exhaust duct 12a extends in spaced relationship. Preferably, the closed pot-like structure is obtained by a deformation of a multi-layer arrangement of single-piece metal sheets so as to form the shapes a, b and c concurrently. It has been found that, even with comparably thick-walled explosion protection structures, a common deformation process can be advantageously used for example by a deep draw procedure, in particular for forming the transition radius area 5 between the bottom area 2 and the sash 3.

The cover 4 in the form of the backplate includes for the connection to the sash 3 a rim 6 which extends fully around the backplate 4 and which is provided at suitable locations with screw joints 7 via which the sash is connected to inner side of the rim 6.

In this way, the closed pot structure can be attached to the backplate 4 at an adjustable angular position safely and in a comparably simple manner.

In summary, the present invention resides in an explosion protection structure 1 for a gas turbine 100, particularly, a radial gas turbine which includes a turbine housing 12 extending fully around a turbine wheel 11 wherein the explosion protection structure 1 consists of a multi-layer structure of a material of high rupture strength. In accordance with the invention, the multi-layer structure includes at least two layers of a metal sheet of high rupture strength and the multi-layer structure is provided with a bottom section 2 and a sash 3 which extends fully around the bottom section 2 so as to form an essentially closed part structure which is supported preferably on a turbine bearing housing and extends around the turbine housing in spaced relationship.

REFERENCE NUMERALS

| 1 | explosion protection |
| 2 | bottom section |
| 3 | sash |
| 4 | cover |
| 5 | transition radius |
| 6 | rim |
| 7 | screw connection |
| 10 | turbine |
| 11 | turbine wheel |
| 12 | turbine housing |
| 13 | inlet duct |
| 20 | bearing |
| 21 | shot |
| 22 | bearing housing |
| 30 | compressor |
| 31 | compressor wheel |
| 32 | compressor housing |
| 100 | gas turbine |
| A | axis |
| W | angular range |
| A | layer |
| B | layer |
| C | layer |
| d, D | distance |

What is claimed is:

1. A gas turbine (100) including a turbine wheel (11) and a turbine housing (12) completely surrounding the turbine wheel (11) and having an axial exhaust gas outlet duct (12a), and an explosion protection (1) comprising a multi-layer (a, b, c) structure of a material of high rupture strength in the form of an essentially closed pot structure including a bottom section (2) with an opening (2a) accommodating the axial exhaust gas outlet duct (12a) in spaced relationship, and a sash (3) extending fully around the turbine housing (12) and being supported by a cover plate (4) which is arranged opposite the bottom section (2).

2. The explosion protection according to claim 1, wherein the multi-layer structure is formed by a deformation of individual metal sheet parts into pot-like metal parts and the multi-layer structure is formed by assembly of such individual pot-like metal parts into the pot-like multi-layer structure.

3. The explosion protection according to claim 1, wherein the multi-layer pot-like structure is obtained by a deformation of a multi-layer arrangement of individual metal sheets.

4. The explosion protection according to claim 1, wherein the cover (4) is in the form of a backplate consisting of metal.

5. The explosion protection according to claim 1, wherein the cover (4) includes a circumferential rim (6) via which it is mounted to the sash (3).

6. The explosion protection according to claim 5, wherein the sash (3) is joined to the rim (6) of the cover (4) along the circumferential inside area of the rim (6) of the cover (4).

7. The gas turbine (100) according to claim 1, wherein the cover plate (4) which is arranged opposite the bottom section (2) is mounted to a gas turbine wheel bearing housing (22).

8. The gas turbine (100) according to claim 7, wherein the turbine wheel (11) is mounted on a shaft (21) supported on a bearing (20) arranged in the wheel bearing housing (22).

* * * * *